Inventor
Per Ingewar Persson
By A. Yates Dowell + A. Yates Dowell, Jr.
Attorneys May 16, 1972 P. I. PERSSON 3,663,723
METHOD OF ARMOURING ARTICLES OF METAL
Filed Sept. 23, 1969 5 Sheets-Sheet 3

May 16, 1972 P. I. PERSSON 3,663,723
METHOD OF ARMOURING ARTICLES OF METAL
Filed Sept. 23, 1969 5 Sheets-Sheet 5

United States Patent Office 3,663,723
Patented May 16, 1972

3,663,723
METHOD OF ARMOURING ARTICLES OF METAL
Per Ingemar Persson, Huddinge, Sweden, assignor to Nitro Nobel AB, Gyttorp, Sweden
Filed Sept. 23, 1969, Ser. No. 860,242
Claims priority, application Sweden, Sept. 23, 1968, 12,803/68
Int. Cl. B26b 5/00
U.S. Cl. 156—179                                    4 Claims

ABSTRACT OF THE DISCLOSURE

The method of welding metal members to each other and to a reinforcing element located between such members to form a unitary armoured mass by heat and pressure created by the rapid burning and expansion of an explosive material which engages at least one surface of the metal members.

---

Figure 1:
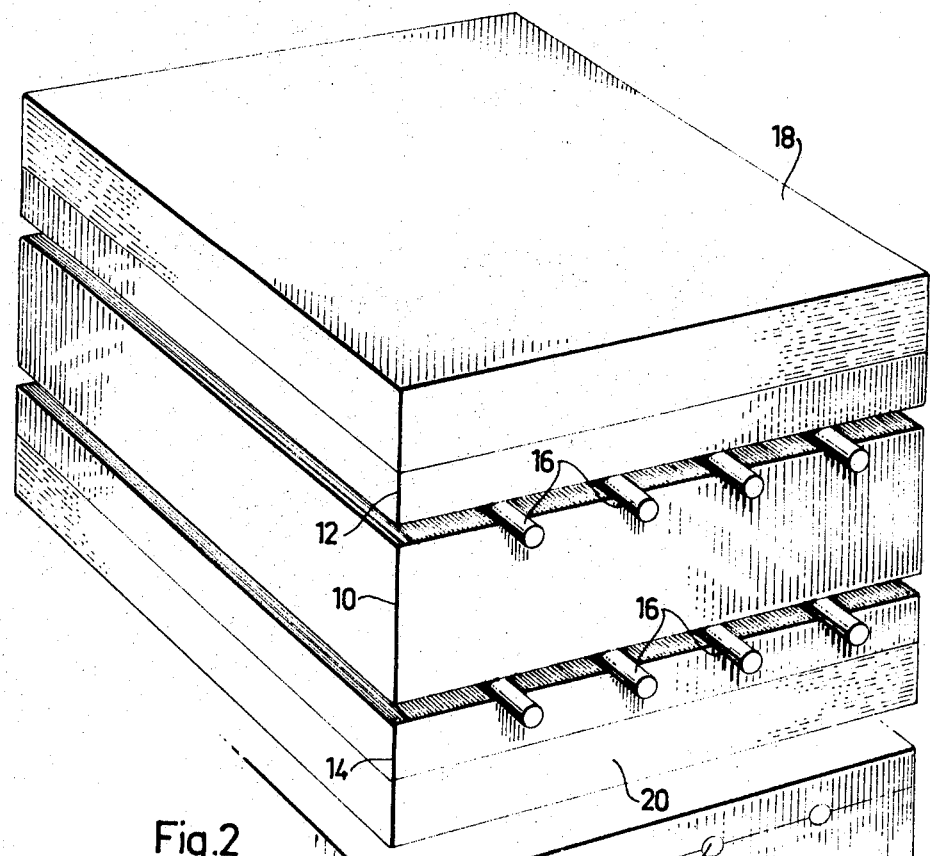

This invention relates to a method of armouring articles of metal.

More particularly this invention relates to a method of armouring articles of metal, such as plates, slabs or tubes, by means of wire-like elements, which preferably also are of metal, but in certain cases at least partially may be of some other material such as quartz or silica, carbon or asbestos. In this way properties improved in different respects are imparted to the article in addition to those which are inherent to the base metal or base metals of which said articles consist.

For this purpose, one has hitherto employed hot pressing, molding, electrolysis, plasma extrusion, powder metallurgy and evaporation in vacuum. Of these methods, hot pressing renders the best results, but is limited to small articles. To manufacture a plate of the magnitude of 30 x 60 centimeters, a press of 1,000 tons is required. Molding of the base metal over the reinforcing armouring is not in the same manner limited with respect to the magnitude of the article, but the reinforcing armouring has low stability and for this reason does not retain exact position. Further, the high temperatures cause difficulties by formation of brittle alloys. Electrolytic deposition of the base metal on the reinforcing armouring is one of the oldest methods, but cavities are formed very often. Plasma extrusion and evaporation in vacuum are primarily used for manufacture of tapes or similar thin articles. Powder compression as well as hot pressing are bound to suitable pressing equipment.

The invention follows another way and is substantially characterized in that the wire-like elements are interposed between at least two metal elements and that a layer of explosive in a manner known per se is placed on the outer face of at least one of the metal elements and is caused to detonate in such a manner that the wire-like elements become embedded in the metal and an intimate bonding between the elements is brought about.

One main feature of the invention is to provide a method for manufacture of metal articles or structural elements having high mechanical strength and low weight. Thus, the base metal may consist of a light metal such as aluminum or magnesium, which through armouring with wires of steel or the like is given a highly improved mechanical strength.

Another object of the invention is to provide a method by means of which a material is obtained which in itself combines high mechanical strength with low weight which in many cases is particularly important. This property is prominent also with respect to stresses coming into existence at high temperatures and through varying load.

Still one object of the invention is to provide a method, by means of which armoured articles of metal having the most variant appearance, such as formed with plane or curvilinear surface and with equal or varying thickness, can be produced with a minimum of tool equipment and without any limitation to predetermined surface sizes. A still further object of the invention is to provide a method of producing armoured articles the reinforcing armouring of which can be pre-tensioned with simple means, thus without requiring greater investments in equipment.

Figure 2:
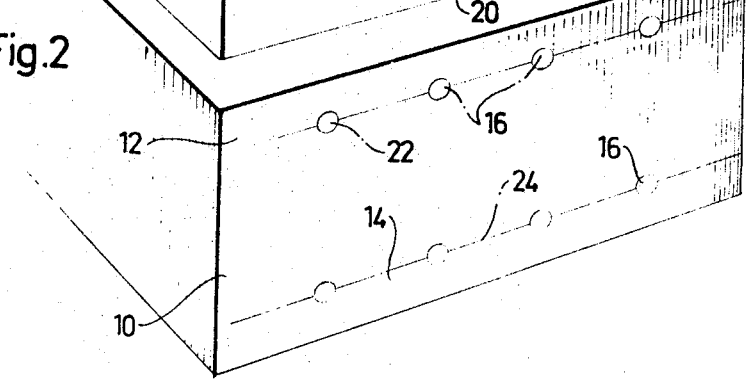
Figure 5:
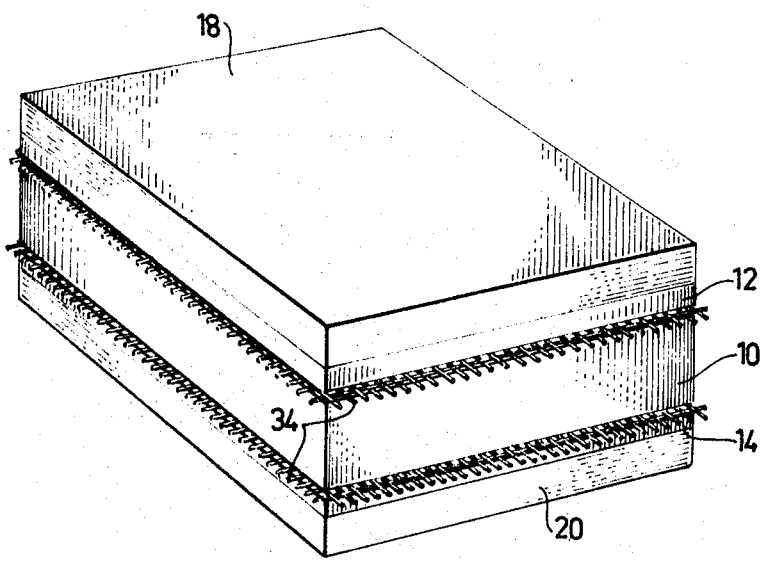
Figure 6:
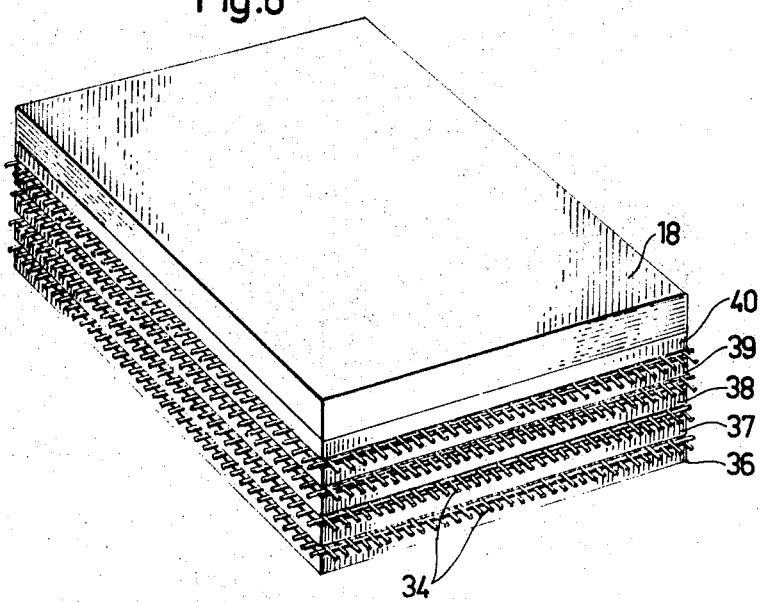
Figure 7:
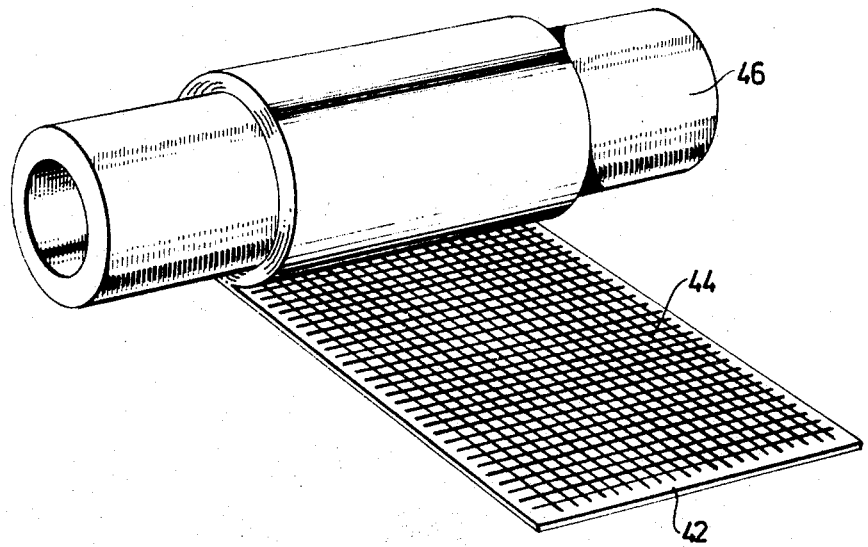
Figure 8:
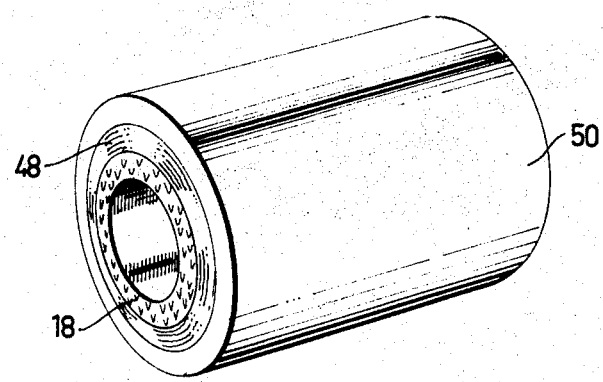

Further objects and advantages of the invention will become apparent from the following description considered in connection with the accompanying drawings, which form part of this specification and in which several embodiments based on experiments in laboratory scale are presented in perspective views, of which:

FIGS. 1 and 2 relate to a first embodiment, FIGS. 3 to 6 each illustrate a further embodiment and FIGS. 7 and 8 finally show still another modified embodiment.

In the various figures the same reference numerals have been used for equivalent parts.

Referring now to FIG. 1, reference numeral 10 denotes a plate of aluminum, which is thicker than thin aluminum plates 12, 14 located on either side thereof. Wires or bars 16 of a material having greater hardness or mechanical strength than aluminum such as silver steel are interposed between the plates. The wires or bars 16 are disposed in mutually parallel relationship and equally spaced from one another. The aluminum plates 10, 12, 14 are spaced from one another for a distance corresponding to the thickness or diameter of the bars 16. Applied onto either external face of the outer aluminum plates 12, 14 is a layer of explosive, such as ammonium nitrate in powder state and designated respectively 18 and 20. Other explosives employed in the explosive technique such as pentaerythritol-tetranitrate (PETN) may also be utilized. The explosive may be intermixed with a filler and its particles are interconnected by means of an adhesive to form a sheeting or the like.

The two layers of explosive are initiated by means of an initiator or an electrically operated blowing cap in the same manner as in conventional blowing operations so that the layers are caused to detonate simultaneously. One electrically operated blowing cap each may be positioned at one short side of the layers 18 and 20, respectively, of explosive, so that the detonation wave is spread therefrom over the layer to the opposite edge thereof. The high detonation speed of the explosive is transferred to the plates 12 and 14, which thereby are bonded together with the central plate 10 while the harder reinforcing bars are caused to penetrate into the plates, especially the outer ones. The aluminum plates 10, 12, 14 will thereby be intimately welded together along the lines 22, 24 indicated in FIG. 2, while at the same time the wires or bars 16 are entirely embedded into the plates and also firmly bonded together with the same.

As will be seen from FIGS. 1 and 2, the reinforcing armouring 16 is located in the outer zones exposed to stresses of the composite plate when this is exposed to a bending force, for example. For this reason the intermediate plate 10 is thicker than the external plates 12, 14.

The bonding together of two metal plates by detonation of an explosive is also called explosive welding and is described in the Swedish patent specification No. 183,172, for example.

Figure 3:
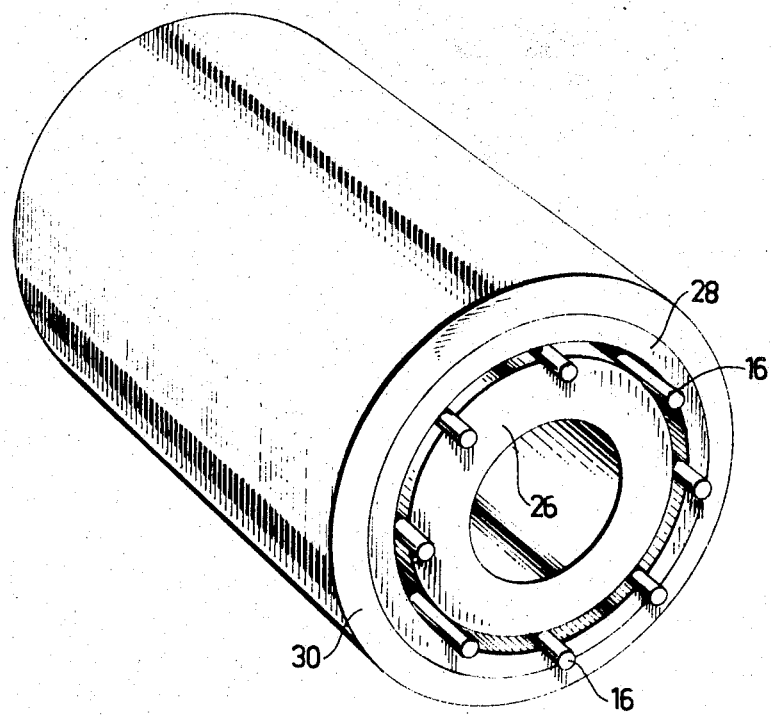

In the embodiment according to FIG. 3, two tubes of aluminum, an inner thicker tube 26 and an outer thinner tube 28, are mounted concentrically the one within the other with an interspace corresponding to the diameters of reinforcing bars or wires 16, which extend in the longitudinal direction of the tube in spaced relationship from one another. A sleeve-formed layer 30 of explosive is disposed around the outer tube 28. This layer is initiated simultaneously around its circumference at one end of the tube, and one obtains in the same manner as in the preceding embodiment an intimate metallic bonding between the two tubes 26, 28, the aluminum metal encasing the reinforcing armouring 16 and also becoming intimately united therewith. It is easily understood that the outer thinner metal tube 28 is deformed by the detonation of the explosive to fit to the inner tube 26 and the reinforcing bars 16. Thereby, the outer tube 28 can be formed so that it when its material is pressed between the reinforcing bars is given longitudinally extending folds on its outer face.

Figure 4:
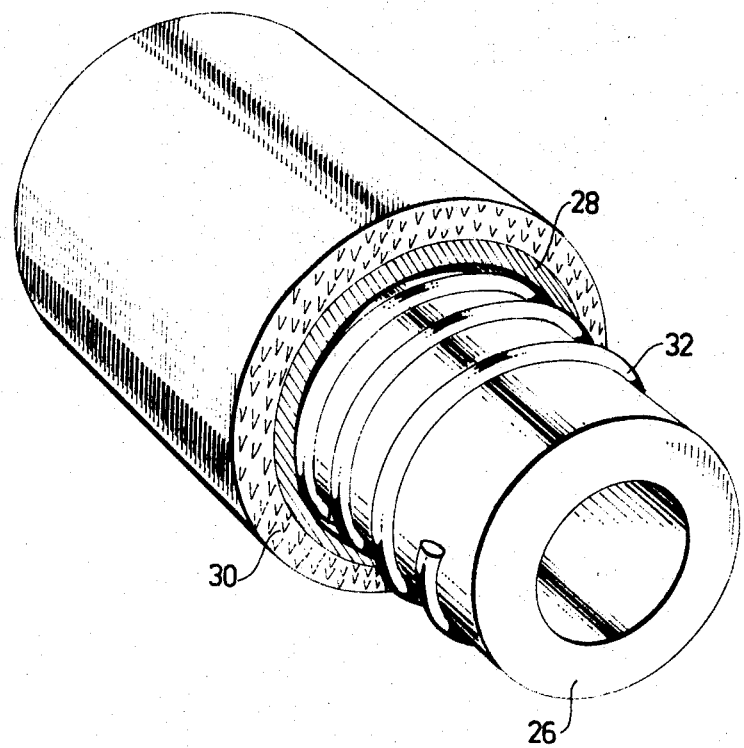

In the embodiment shown in FIG. 4, a helical spring 32 of some hard material such as steel is interposed between the outer and the inner aluminum tubes 26 and 28, respectively. The outer tube is encased by the layer 30 of explosive, which is caused to detonate as is described in connection with FIG. 3. In this case, a helical armouring is thus obtained between the aluminum tubes 26 and 28 bonded the one on the other after the detonation of the explosive.

The embodiment according to FIG. 5 differs from that according to FIG. 1 by the reinforcing armouring consisting of a net 34 of stainless steel or similar material having a higher mechanical strength than the plates 10, 12, 14 made of aluminum, for example. This net is composed of wires crossing one another and, if desired, woven into one another like a fabric. Upon detonation of the layer 20 of explosive, the composite plate will have the same appearance as that according to FIG. 2 with the exception that the reinforcing wires extend in directions transversally crossing one another.

In the embodiment according to FIG. 6 four layers of steel net 34 have been interposed between five thin aluminum plates 36 to 40, each of which has a thickness of 1 millimeter, for example. After the explosive welding brought about by the layer 18, a compact coherent sandwich plate structure having four reinforcing layers is obtained.

In the embodiment according to FIGS. 7 and 8, a strip-shaped thin plate 42 of e.g. aluminum with a net 44 positioned thereupon of a high-grade material such as steel is wound in a plurality of turns on a cylinder 46. After that the roll thus obtained of reinforcing net and metal plate has obtained desired thickness, it is removed from the cylinder 46 and introduced as a unit 48 into a strong steel mold 50 having a cylindrical inner surface. A layer 18 of explosive is then applied to the inner side of the roll 48. Through detonation of the explosive the roll 46 is bonded together to a tube having a homogeneous compact cross section, which tube then is removed from the mold 50.

According to the invention, the reinforcing armouring can be pre-tensioned without difficulty either in a mechanical way or by heating e.g. by electricity immediately prior to the initiating of the explosive. Since in the latter case the base metal only had time to be heated inconsiderably, the reinforcing wires will be exposed to tension when they after the explosive welding are cooled down to the temperature of the base metal.

The reinforcing wires may have any desired sectional configuration, such as a circular, rectangular, oval or any other one. In the same manner, the tubes armoured according to the invention may have instead of a cylindrical a square cross section, for example. By applying a blasting mat or the like stop means on the layer of explosive, the bonding effect can be intensified.

While several more or less specific embodiments of the invention have been shown and described, it is to be understood that this is for purpose of illustration only and that the invention is not to be limited thereby, but its scope is to be determined by the appended claims.

What is claimed is:

1. The method of explosive welding at least two metal members together and to at least one high-strength reinforcing member located therebetween to form a unitary member comprising the steps of: providing a first metal member having a smooth surface, providing a second metal member having a smooth surface located adjacent to and generally complementary with said surface of said first member, placing at least one high-strength reinforcing element between and in proximity to said surfaces of said first and second metal members, locating a layer of explosive on at least one of said metal members opposite the surface thereof, said layer of explosive covering substantially the entire opposite surface of said one metal member, and causing said layer of explosive to detonate, whereby heat and pressure created by the detonation of said explosive cause the adjacent surfaces of said first and second members to be welded to each other and to said reinforcing element with said reinforcing element partially imbedded within both of said metal members to form a unitary reinforced member.

2. The method of claim 1 in which the surfaces of said metal members are generally flat.

3. The method of claim 1 in which the high-strength reinforcing element is interposed between two concentric tubular metal members.

4. The method of manufacturing reinforced tubular members comprising the steps of: providing a strip of metal, placing at least one high-strength reinforcing element on said strip of metal, winding a predetermined number of coils of said strip of metal and said reinforcing element on a cylinder to form a roll, removing the cylinder from the roll, placing the roll within the cylindrical bore of a mold, inserting a layer of explosive within said roll in proximity to the entire inner diameter thereof, and causing said layer of explosive to detonate, whereby heat and pressure created by the detonation of said explosive cause the coils of metal to be welded to each other and to said reinforcing element.

References Cited
UNITED STATES PATENTS

| | | | |
|---|---|---|---|
| 2,739,092 | 3/1956 | Stevenson | 156—179 |
| 3,201,862 | 8/1965 | Gotoh | 29—473.9 |
| 3,341,650 | 9/1967 | Broske | 29—254 |
| 3,397,444 | 8/1968 | Bergmann et al. | 29—470.1 |
| 3,432,912 | 3/1969 | Doherty et al. | 29—470.1 |
| 3,528,162 | 9/1970 | Sagara | 29—473.9 |

CARL D. QUARFORTH, Primary Examiner

R. L. TATE, Assistant Examiner

U.S. Cl. X.R.

29—470.1